United States Patent [19]

Nitsch

[11] Patent Number: 4,566,784
[45] Date of Patent: Jan. 28, 1986

[54] PHOTOGRAPHIC ROLLER COPYING APPARATUS WITH A DEVICE FOR THREADING A NEW PAPER TAPE

[75] Inventor: Wilhelm Nitsch, Munich, Fed. Rep. of Germany

[73] Assignee: Agfa-Gevaert Aktiengesellschaft, Leverkusen, Fed. Rep. of Germany

[21] Appl. No.: 663,992

[22] Filed: Oct. 22, 1984

[30] Foreign Application Priority Data

Nov. 4, 1983 [DE] Fed. Rep. of Germany ....... 3339975

[51] Int. Cl.⁴ .............................................. G03B 27/58
[52] U.S. Cl. ....................................... 355/72; 355/29; 355/32; 355/71
[58] Field of Search ........................ 355/29, 32, 71, 72

[56] References Cited

U.S. PATENT DOCUMENTS

| 1,325,198 | 12/1919 | Hochstetter | 355/71 |
| 3,807,855 | 4/1974 | Zajac | 355/29 |
| 4,257,702 | 3/1981 | Miller | 355/71 |
| 4,452,529 | 6/1984 | Olsson | 355/72 |

Primary Examiner—Monroe H. Hayes
Attorney, Agent, or Firm—Michael J. Striker

[57] ABSTRACT

In a photographic copying apparatus, a device for threading a starting end of a new copying paper roll includes drive rollers, a guide support for the advanced paper and a pivotable flap which periodically closes on the paper when the advancement is interrupted for a threading process. An opening is formed in the flap to produce a test copy for controlling the operation of the apparatus. An exposure control device loads the test copy with empirically determined amounts of light when no negative is present on a negative platform of a printing station.

6 Claims, 3 Drawing Figures

PHOTOGRAPHIC ROLLER COPYING APPARATUS WITH A DEVICE FOR THREADING A NEW PAPER TAPE

BACKGROUND OF THE INVENTION

The present invention relates to photographic copying apparatus in general, and more particularly to a device for threading up an advanced tape material into the apparatus.

Photographic copying apparatus of the foregoing type have been known. A roll of the film to be copied is advanced from a feed reel to a take-up reel over a platform for an original while a tape material, such as paper, is advanced below an objective lens onto which an image of the original is projected. The roller copying apparatus of the type under consideration is disclosed, for example in German published patent application No. 22 44 960. Flaps are provided in the disclosed apparatus for closing an illumination opening for a duration of the threading process, these flaps can additionally take up the function of the auxiliary locks during the illumination pauses.

This function of the auxiliary lock excludes at first the use of the flaps as an auxiliary means for producing a test illumination.

SUMMARY OF THE INVENTION

It is an object of this invention to provide an improved photographic roller copying apparatus.

It is another object of the invention to provide in a roller copying apparatus a possibility of the application of a precise test illumination to a copying material to examine the printer itself and eventually an apparatus for a subsequent treatment of the film base.

These and other objects of the invention are attained by a photographic copying apparatus for copying a roll film, comprising a printing station, a platform for a negative means for advancing a film over said printing station; drive means and guide means for advancing a tape copying material below said printing station; threading means for threading a starting end of a new tape of a copying material, provided on said drive and guide means, said threading means including a pivotable flap which periodically closes the tape in the region below said printing station when the advancement of the copying material is interrupted for duration of a threading process, said flap being formed with an opening for producing a test copy exposed in said opening in a contact process; and exposure control means for producing a test copy, said exposure control means exposing said test copy in said flap to empirically determined amounts of light when no negative is placed on said negative platform.

The arrangement of the test negative in the flap of the threading device of the copying apparatus is very inexpensive because the flap has not been intended before for this function. Therefore, the present invention has a number of advantages. Due to the provision of the contact exposure a test copy of the same size is always produced independently from a respective image scale of the objective. Various image scales can be mathematically determined in the apparatus of this invention by the measurement of the duration of exposure or of the intensity of light. Finally by the programming of the process of threading a new tape of the copying paper, a test copy can be automatically exposed in each threading process at the beginning of the non-exposed region of the copying paper. This test copy is then used for a regular control of the apparatus.

The flap may have at least one slot for exposing a cut marking provided on the tape of copying material.

The apparatus may further include feelers connected to said exposure control means and mounted on said guide means in a path of advancement of the tape of copying material, said feelers determining a start and an end of the tape being advanced.

The exposure control means may be a computer for measuring the amounts of light required for a copying process.

The computer may be provided with storage means for storing the amounts of light required for producing a test copy.

The apparatus may further include a signal generator connected to said computer and operative for generating a signal depending on an actual projection scale of an objective lens of said printing station.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
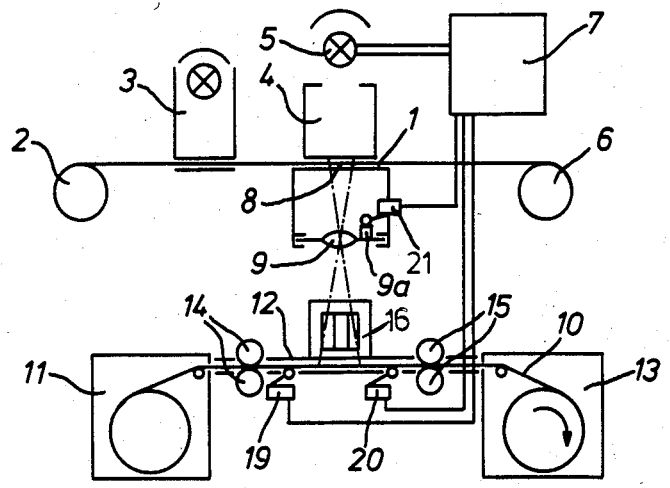
FIG. 1 is a schematic view of the roller copying apparatus with a flap according to the invention.

Referring now to the drawings in detail, and firstly to FIG. 1 thereof, it will be seen that the printing apparatus of this invention comprises a platform for an original 1 and a film-advancing device including a film feed roll 2 and a film take-up roll 6 which advance a film from roll 2 through a measuring station 3 and printing station 4, having a printer light source 5 and disposed above the original platform 1, to the take-up roll 6. The duration of exposure is assumed from the results of the measurement at the measurement station 3 by an illumination computer 7 for the light source 5 or the non-illustrated lock. The original positioned in the photocell window 8 is projected through an objective lens 9 onto a tape-like, light-sensitive film base 10 which is advanced from a feed cassette 11 over a paper platform 12 to a take-up cassette 13. Two pair of transport rollers 14 and 15 are provided for advancing the light-sensitive film base or paper 10.

A pin 9a is mounted to a plate of the objective lens 9, which pin generates a signal via a respective feeler 21 which is in electrical connection with computer 7. The information for controlling duration of exposure is in this manner, via a projection scale of the objective lens 9, available at the computer 7.

With the objective having a continually changeable focal distance the information about the duration of exposure can be derived from the projection scale and from the potentiometer coupled with the adjusting element in a conventional fashion.

Figure 2:
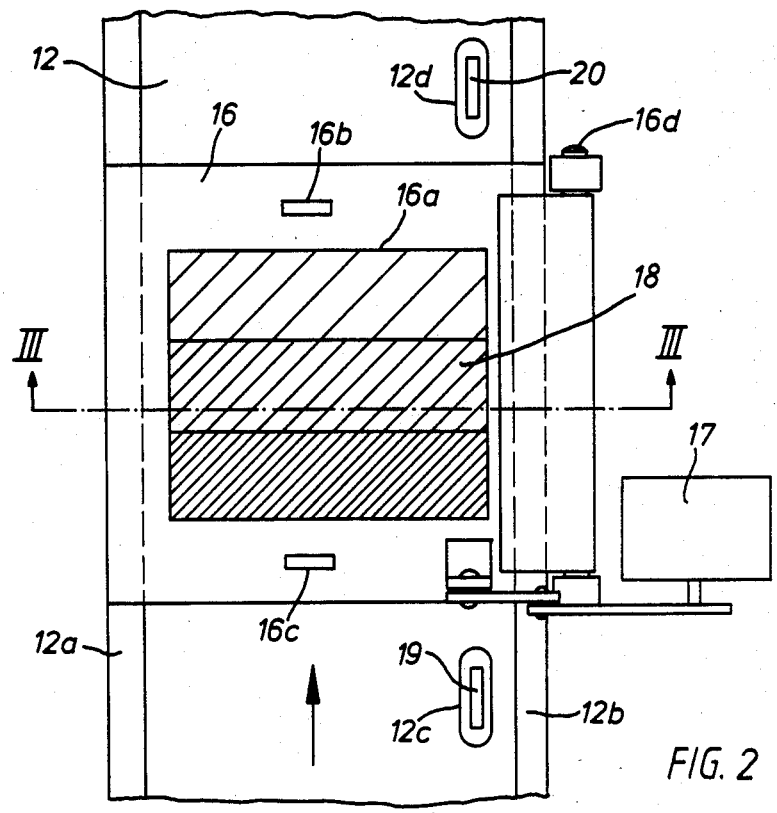
FIG. 2 is a partially sectional view of the platform for a copying material with the flap of the threading arrangement.
Figure 3:
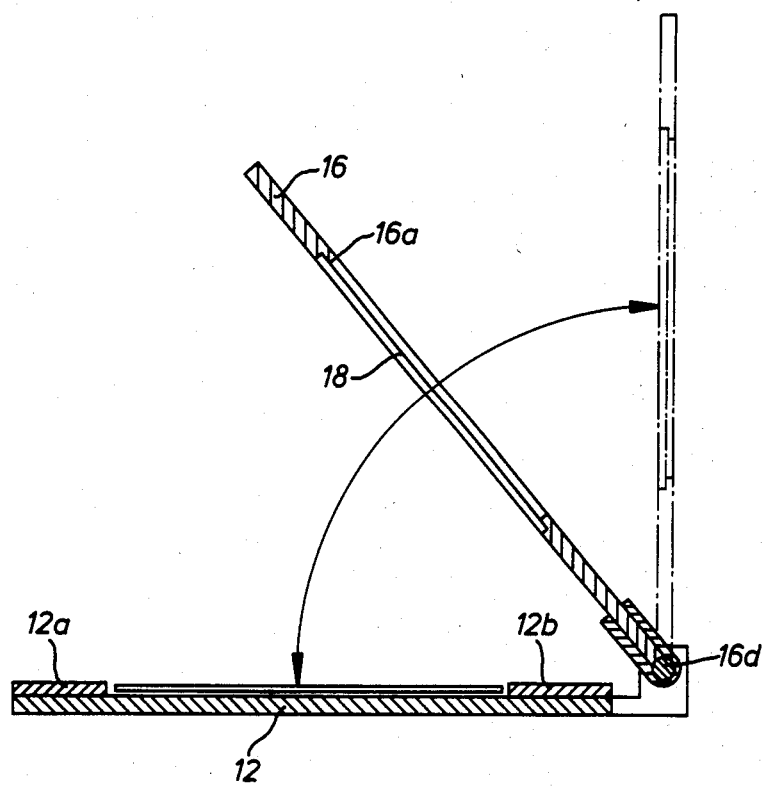
FIG. 3 is side sectional view of the flap of the threading arrangement.

Individual details of the paper platform 12 and the arrangement for threading a copying paper 10 are specifically illustrated in FIGS. 2 and 3. The paper platform 12 includes a paper supporting surface and two side guides 12a and 12b which prevent a lateral travelling of the tape tightly held by roller pairs 14 and 15.

Each time the paper roll in the feed cassette 11 is finished a new paper-threading process through roller pairs 14, 15 towards the take-up cassette 13 is necessary.

At latest when the starting end of the paper tape runs between transport rollers 14 the flap 16 is closed. This flap is pivotable about an axle 16d, which extends parallel to the direction of advancing of paper tape 10. Flap 16 is pivoted from a rest or inoperative position, which is normal to the plane of the paper, to an operative position directly above the paper support or platform 12. Flap 16 in its closed position forms together with paper support 12 and its side guides 12a and 12b a passage about 1.5 mm high. The starting end of the paper tape is advanced through that passage by means of transport rollers 14.

The inoperative position of flap 16 is shown in FIG. 3 in dash-dotted lines while the solid lines indicate the flap in the position on its way towards the operative position which is also shown in FIG. 2. A rotary magnet 17 is provided to pivot flap 16 back and forth. Magnet 17 can be either engaged immediately at the pivot axle of the flap or on the flap itself. The control of magnet 17 is carried out by computer 7 when the latter calls for the program for threading the paper end into the apparatus.

Flap 16 has a central opening 16a which extends approximately over the greater portion of the paper of a smallest width. Flap 16 further has two lateral seat-shaped openings 16b and 16c which are located in correspondence with illuminated cut markings.

A sample or test copy 18 for a so-called test illumination is held at its edge or glued to the walls of the opening 16a. Test illuminations serve the purpose of controlling the copying apparatus. The test copy can include, for example three optic light filters of a graded thickness which expose to light the copying material in contact therewith, specifically to empirically determined amounts of light. If the surface of the test copy is comparatively large the distance between the test copy and the paper does not practically influence the quality of the test exposure; the test copies can be also formed as ground glass filters secured to the upper side of the flap 16.

After the development of the tape of the copying material a portion of the start or the end of the tape roll appears on which the markings are exposed in correspondence with slots 16b and 16c, so that a normal copy of normal dimensions is produced, and a precise known position of the filter image is obtained, which can directly inserted into a densitometer. These measurement values are processed for controlling the copying apparatus and its consequent adjustment, as disclosed, for example in German Offenlegungsschrift No. 29 11 566 (=U.S. Ser. No. 385,923).

Openings 12c and 12d are further provided in the paper support 12 before and behind the flap 16. Feelers 19 and 20, respectively for the copying material, namely copying paper, are provided, which may be microswitches, the arms of which extend through openings 12c and 12d.

Feeler 19 issues a signal when the end of the paper roll is positioned shortly before the printing station while feeler 20 issues a signal when an advanced starting end of a new paper tape passes the flap 16.

The mode of operation of the above described apparatus varies depending on the degree of automatization of the apparatus. In a simple construction the actuation of the rotary magnet 17 is controlled by hand, and a test copy is released by hand when the starting end of the paper tape enters the position under flap 16. The required duration of exposure can be adjusted by hand without having a negative on the negative platform 8 and can be also stored in a storage means of the computer. Feelers 19 and 20 are electrically connected with the exposure control device or computer 7 as shown in FIG. 1.

A copying apparatus provided with a program for threading a new roll of a copying material can start this test exposure automatically after the insertion of a new cassette 11. It is also provided in this apparatus that the amounts of light necessary for printing, defined by feeler 21, can be maintained constant independently from a respective projection scale by varying the duration of exposure or the intensity of light.

It will be understood that each of the elements described above, or two or more together, may also find a useful application in other types or photographic roller copying apparatus with a device for threading a new paper roll differing from the types described above.

While the invention has been illustrated and described as embodied in a photographic copying apparatus with a device for threading a new paper tape into an exposure chamber of the apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

As computer 7 a microprocessor may be used, for example a microprocessor delivered by Digital Equipment Corporation under the designation FALCON.

What is claimed as new and desired to be protected by Letters Patent is set forth in the appended claims:

1. A photographic copying apparatus for copying a roll film, comprising a printing station, platform for a negative, means for advancing a film over said printing station; drive means and guide means for advancing a tape copying material below said printing station; threading means for threading a starting end of a new tape of a copying material and provided on said drive and guide means, said threading means including a pivotable flap which periodically closes the tape in the region below said printing station when the advancement of the copying material is interrupted for duration of a threading process, said flap being formed with an opening for producing a test copy exposed in said opening in a contact process; and exposure control means for producing a test copy, said exposure control means exposing said test copy in said flap to empirically determined amounts of light when no negative is placed on said platform for a negative.

2. The apparatus as defined in claim 1, wherein said flap has at least one slot for exposing a cut marking provided on the tape of copying material.

3. The apparatus as defined in claim 2, further including feelers connected to said exposure control means and mounted on said guide means in a path of advancement of the tape of copying material, said feelers determining a start and an end of the tape being advanced.

4. The apparatus as defined in claim 3, wherein said exposure control means is a computer for measuring the amounts of light required for a copying process.

5. The apparatus as defined in claim 4, wherein said computer is provided with storage means for storing the amounts of light required for producing a test copy.

6. The apparatus as defined in claim 5; further including a signal generator connected to said computer and operative for generating a signal depending on an actual projection scale of an objective lens of said printing station.

* * * * *